(12) United States Patent
Kim et al.

(10) Patent No.: US 7,593,077 B2
(45) Date of Patent: Sep. 22, 2009

(54) DISPLAY APPARATUS HAVING INNOVATIVE ARRAY SUBSTRATE

(75) Inventors: Jae-Hyun Kim, Suwon-si (KR); Sung-Wook Kang, Seoul (KR); Dae-Ho Choo, Yongin-si (KR)

(73) Assignee: Samsung Electronics, Co., Ltd., Gyeonggi-Do (KR)

( * ) Notice: Subject to any disclaimer, the term of this patent is extended or adjusted under 35 U.S.C. 154(b) by 489 days.

(21) Appl. No.: 11/473,456

(22) Filed: Jun. 22, 2006

(65) Prior Publication Data

US 2006/0290851 A1      Dec. 28, 2006

(30) Foreign Application Priority Data

Jun. 22, 2005      (KR)      ............ 10-2005-0053864

(51) Int. Cl.
*G02F 1/1368*      (2006.01)
*G02F 1/1335*      (2006.01)

(52) U.S. Cl. ............ 349/114; 349/57; 349/113; 349/187

(58) Field of Classification Search ............ 349/113, 349/114, 139, 143, 147, 187, 42, 57, 119; 438/30; 345/87, 92

See application file for complete search history.

(56) References Cited

U.S. PATENT DOCUMENTS

| 6,570,634 B2 * | 5/2003 | Kim ............ 349/107 |
| 2002/0097358 A1 * | 7/2002 | Ueki et al. ............ 349/113 |
| 2004/0109663 A1 | 6/2004 | Olczak |

FOREIGN PATENT DOCUMENTS

CN      1538222 A      10/2004

* cited by examiner

*Primary Examiner*—Dung Nguyen
*Assistant Examiner*—Tai Duong
(74) *Attorney, Agent, or Firm*—Haynes and Boone, LLP

(57) ABSTRACT

An LCD array substrate for a transflective-type LCD includes an E-field reflecting section formed under a transmitting window that reflects light when an electric field is applied. A gate line, a gate electrode and a transparent electrode are formed on a substrate. A channel layer between source and drain electrodes and an E-field reflecting layer are formed on the gate electrode and the transparent electrode, respectively. Portions of a protecting layer are removed to form a contact hole disposed over the drain electrode, and a light-transmitting hole over the E-field reflecting layer. A pixel electrode that is electrically connected to the drain electrode through the contact hole, makes contact with the E-field reflecting layer through the light-transmitting hole.

24 Claims, 15 Drawing Sheets

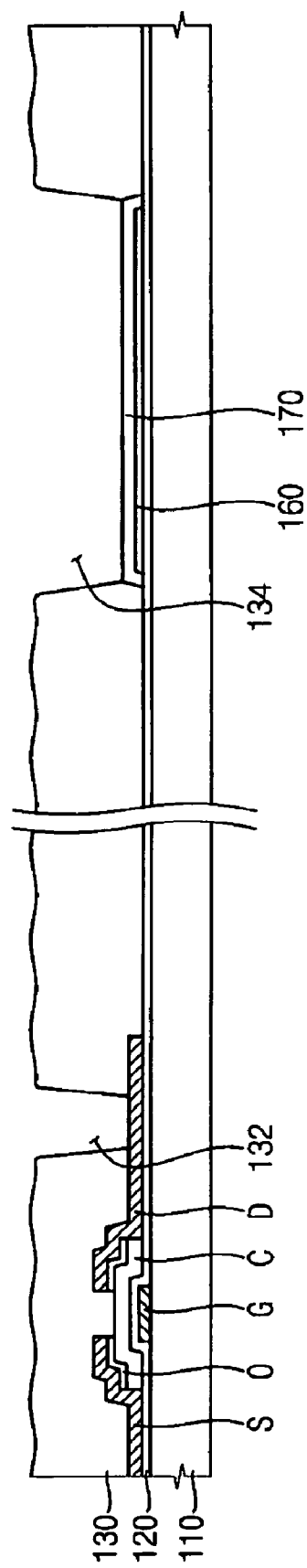

DISPLAY APPARATUS HAVING INNOVATIVE ARRAY SUBSTRATE

CROSS-REFERENCE TO RELATED APPLICATIONS

This application relies for priority upon Korean Patent Application No. 2005-53864 filed on Jun. 22, 2005, the contents of which are herein incorporated by reference in its entirety.

FIELD OF THE INVENTION

The present invention relates to an improved display apparatus and, more particularly, to an array substrate for enhancing display quality and a method of manufacturing the array substrate.

DESCRIPTION OF THE RELATED ART

A liquid crystal display (LCD) apparatus may be classified as either a transmissive type LCD apparatus which employs a backlight assembly and hence can be used where there is no ambient light, or as a reflective type LCD apparatus which uses ambient light such as sunlight. However, the transmissive type LCD has higher power consumption increases due to the backlight assembly and its display quality may be lowered due to reflection of ambient light. The reflective-type LCD apparatus has lower power consumption, and higher display quality outdoors but cannot be used in a dark place. Therefore, active research is being performed on a transflective type LCD apparatus having merits of both the transmissive-type LCD apparatus and the reflective-type LCD apparatus.

The transflective-type LCD apparatus includes a backlight assembly and an LCD panel which displays an image by using ambient light and the light from the backlight assembly. The pixels of the LCD panel include a transmissive region and a reflective region. In the transmissive mode, the transflective-type LCD apparatus displays an image using light from the backlight assembly while in the reflective mode it displays an image by using ambient light. Therefore, the transflective-type LCD apparatus operates in the transmissive mode in a dark region and operates in the reflective mode in a well lit region. When operating in the reflective mode, a portion of light is reflected by the reflective region but the remaining portion of the light passes through the transmissive region. Therefore, the remaining portion of the light is leaked, resulting in lower luminance and poorer display quality.

SUMMARY OF THE INVENTION

The present invention provides a transflective-type LCD in which the display panel comprises a first substrate, a second substrate and a liquid crystal layer. The first substrate has a reflecting portion reflecting the ambient light in response to an electric field, and a transmitting portion transmitting the light generated by the backlight assembly. The light-reflecting layer includes an opening corresponding to a transmitting window. An E-field reflecting section is formed under the transmitting window that reflects light when an electric field is applied. A gate line, a gate electrode and a transparent electrode are formed on the substrate. A channel layer and an E-field reflecting layer are formed on the gate electrode and the transparent electrode, respectively. A data line is formed, and source and drain electrodes are formed on the channel layer. A protecting layer is formed on the substrate to cover the data line, the source electrode and the drain electrode. Portions of the protecting layer are removed to form a contact hole disposed over the drain electrode, and a light-transmitting hole over the E-field reflecting layer. A pixel electrode that is electrically connected to the drain electrode through the contact hole, makes contact with the E-field reflecting layer through the light-transmitting hole. A light-reflecting layer having an opening corresponding to a transmitting window is formed over the E-field reflecting layer.

BRIEF DESCRIPTION OF THE DRAWING

The above and other features and advantages of the present invention will become more apparent from a reading of the ensuing description together with reference to the drawings, in which:

FIGS. 11A to 11E are cross-sectional views illustrating a method of manufacturing an array substrate according to an example embodiment of the present invention.

DESCRIPTION

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Example Embodiment 1 of a Display Panel Assembly

Figure 1:
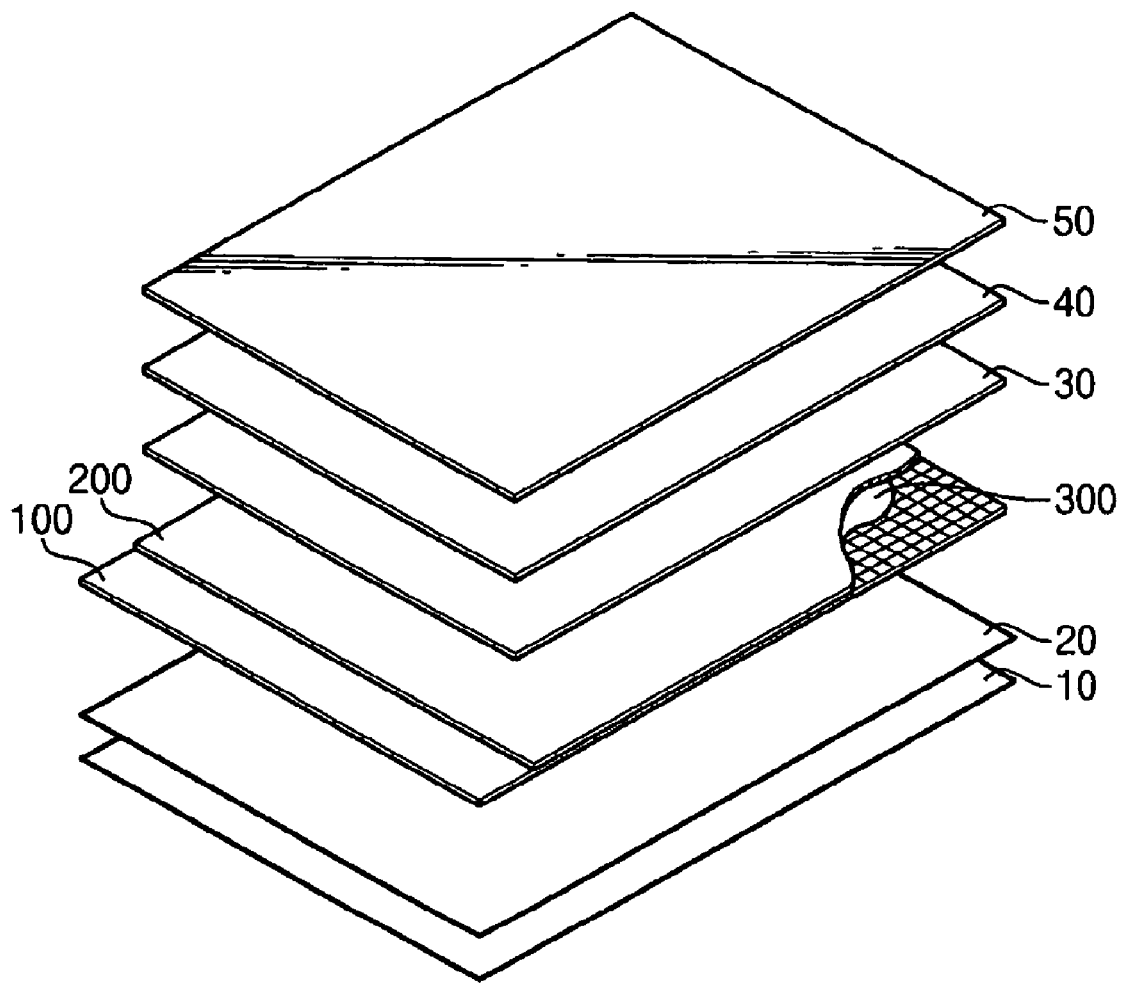
FIG. 1 is an exploded perspective view illustrating a display panel assembly according to an example embodiment of the present invention.
Figure 2:
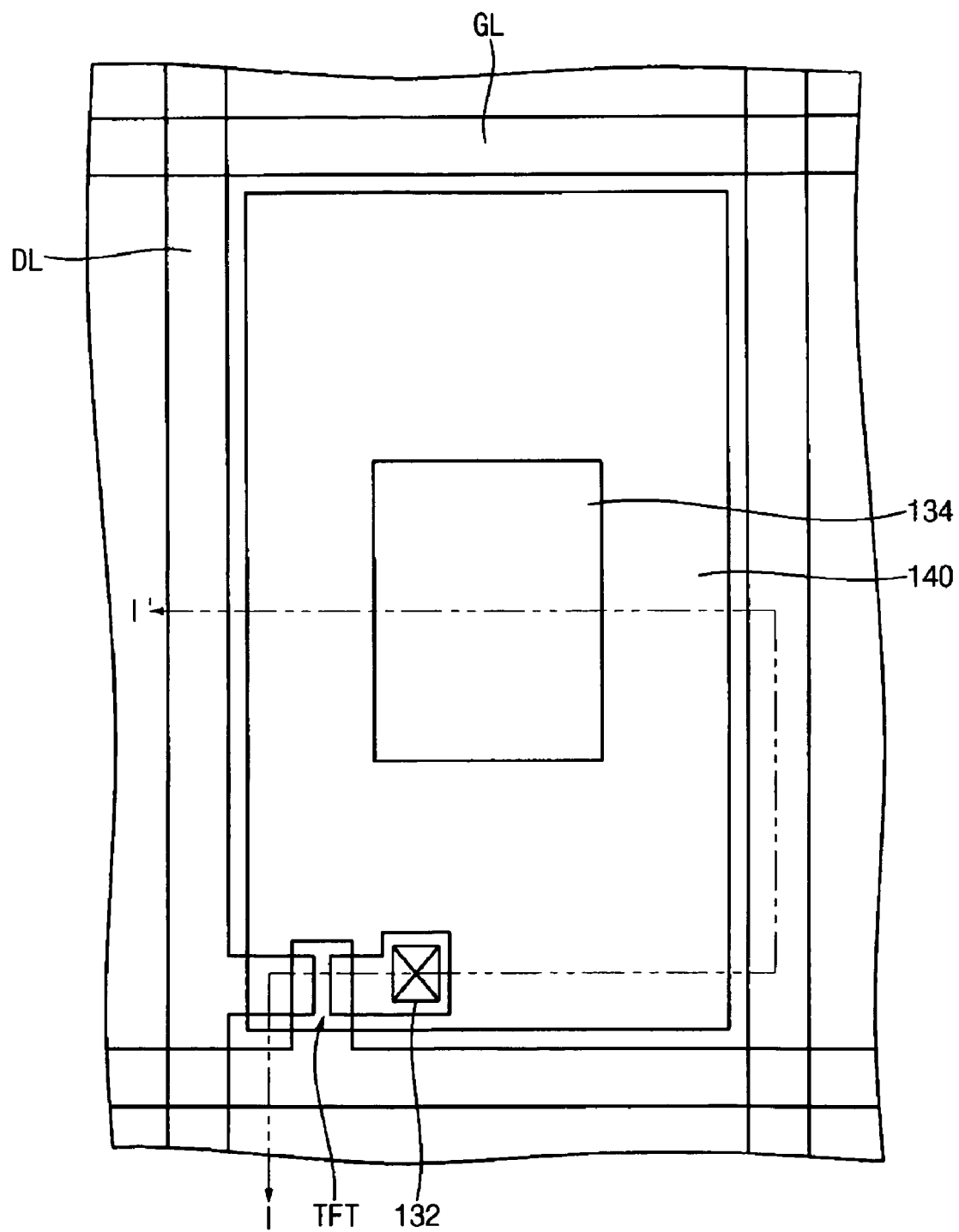
FIG. 2 is a plan view illustrating a pixel of the display panel assembly in FIG. 1.
Figure 3:
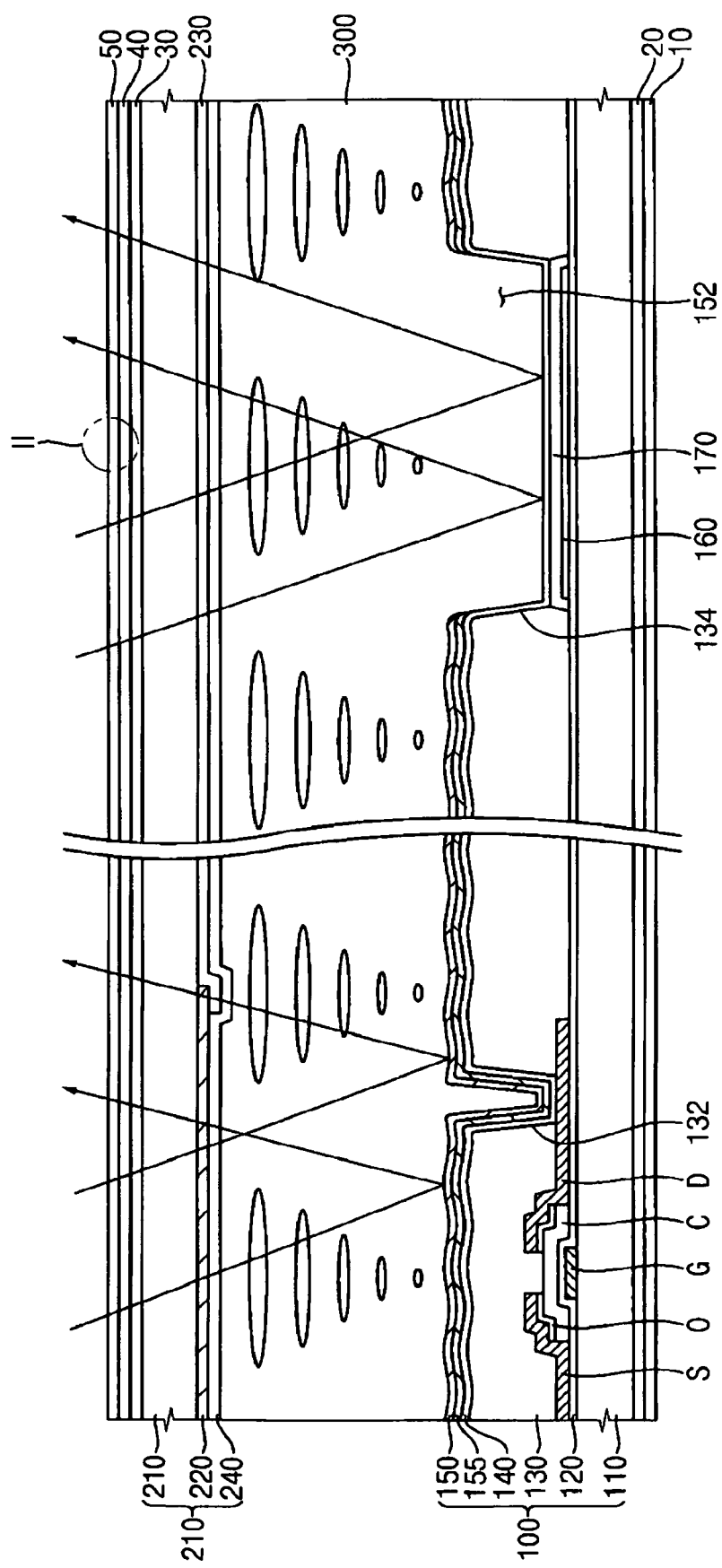
FIG. 3 is a cross-sectional view taken along a line I-I' in FIG. 2.

FIG. 1 is an exploded perspective view illustrating a display panel assembly according to an example embodiment of the present invention. FIG. 2 is a plan view illustrating a pixel of the display panel assembly in FIG. 1, and FIG. 3 is a cross-sectional view taken along a line I-I' in FIG. 2. Referring to FIGS. 1 to 3, a display panel assembly includes a first substrate 100, a second substrate 200, a liquid crystal layer 300, a first polarizing plate 10, a first retardation film 20, a second retardation film 30, a second polarizing plate 40 and a light-refracting sheet 50. The display panel displays an image by using light provided by a backlight assembly or ambient light. The first polarizing plate 10 is disposed under the first substrate 100. The first retardation film 20 is disposed between the first polarizing plate 10 and the first substrate 100. The second polarizing plate 40 is disposed over the second substrate 200. The second retardation film 30 is disposed between the second polarizing plate 40 and the second substrate 200. The light-refracting sheet 50 is disposed on the second polarizing plate 40.

The first substrate 100 includes a first transparent substrate 110, a data line DL, a gate line GL, a storage electrode (not shown), a gate insulation layer 120, a thin-film transistor TFT, a protecting layer 130, a pixel electrode 140, a light-reflecting layer 150, a connecting layer 155, a transparent electrode 160, an electric field (E-field) reflecting layer 170 and a first alignment layer (not shown).

First substrate 100 has a plate-shape. First transparent substrate 110 is of an optically transparent material such as glass, quartz, etc. A plurality of gate lines GL are formed on the first transparent substrate 110. Gate line GL extends in a first direction. A storage electrode which assists the pixel electrode in maintaining a pixel voltage is formed simultaneously with gate line GL and extends in the same direction as that of gate line GL. Gate insulation layer 120 is formed on first transparent substrate 110 such that gate insulation layer 120 covers gate line GL and the storage electrode. Thin-film transistor TFT includes a gate electrode G, a source electrode S, a drain electrode D, a channel layer C and an ohmic contact layer O. Gate electrode G extends from gate line GL along a second direction that is substantially perpendicular to the first direction. Gate insulation layer 120 is disposed on gate electrode G, and channel layer C is disposed on gate insulation layer 120 such that channel layer C crosses gate electrode G. Ohmic contact layer O is disposed on channel layer C. Ohmic contact layer O reduces contact resistance between channel layer C and the drain and source electrodes. The source electrode S and the drain electrode D are disposed on the ohmic contact layer O such that the source electrode S and the drain electrode D are spaced apart from each other.

A plurality of data lines DL are formed on gate insulation layer 130 and extend in second direction. Source electrode S extends from data line DL along the first direction. Protecting layer 130 is formed on gate insulation layer 120 such that the protecting layer 130 covers thin-film transistor TFT and data lines DL. For example, an organic layer may be employed as the protecting layer 130 which is thicker than gate insulation layer 120. Protecting layer 130 has an embossed patterns formed on its surface. Protecting layer 130 includes a contact hole 132 and a light-transmitting hole 134. Pixel electrode 140 is electrically connected to drain electrode D of thin-film transistor TFT through contact hole 132. Light-transmitting hole 134 corresponds to transmitting window 152.

Pixel electrode 140 is formed on the protecting layer 130 and is disposed in a pixel region defined by each gate line GL and each of the data line DL. Pixel electrode 140 is electrically connected to the drain electrode D to receive a pixel voltage from the drain electrode D.

Pixel electrode 140 makes contact with E-field reflecting layer 170 through light-transmitting hole 134. Pixel electrode 140 has an embossed patterns in the region disposed toward protecting layer 130, and a flat surface at the region disposed toward the E-field reflecting layer 170. Pixel electrode 140 includes an optically transparent and electrically conductive material such as indium tin oxide (ITO), indium zinc oxide (IZO), amorphous indium tin oxide (a-ITO), etc. The optically transparent and electrically conductive layer may be patterned through a photolithography process to form pixel electrode 140.

Light-reflecting layer 150 is formed on pixel electrode 140 except for the light-transmitting hole 134. The light-reflecting layer 150 includes, for example, metal for reflecting light. The light-reflecting layer 150 includes, for example, aluminum (Al), aluminum neodymium (AlNd), etc. Light-reflecting layer 150 includes a reflecting portion that reflects a portion of ambient light, and the transmitting window 152 that transmits a portion of light from the backlight assembly. The reflecting portion corresponds to a region where the light-reflecting layer 150 is formed, and the transmitting window 152 corresponds to a region where the light-reflecting layer 150 is not formed. Preferably, an area of the transmitting window 152 is about 60% to about 70% of a unit pixel area.

Connecting layer 155 is disposed between light-reflecting layer 150 and pixel electrode 140. Connecting layer 155 reduces deterioration of surface characteristics that may be induced when the light-reflecting layer 150 makes contact with pixel electrode 150. The connecting layer 155 includes, for example, molybdenum tungsten (MoW). Transparent electrode 160 is correspondingly formed on gate insulation layer 120 to the light-transmitting hole 134. Transparent electrode 160 includes an optically transparent and electrically conductive material such as indium tin oxide (ITO), indium zinc oxide (IZO), amorphous indium tin oxide (a-ITO), etc., the same material as that of pixel electrode 140.

When a driving voltage provided from an external device is applied to the transparent electrode 160, an electric field is generated between pixel electrode 140 and the transparent electrode. For example, the electric field generated between pixel electrode 140 and transparent electrode 160 is in a range of about 10 kV/cm to about 100 kV/cm, and a frequency is in a range of about 0.1 kHz to about 10 kHz.

The driving voltage applied to transparent electrode 160 is different from the pixel voltage applied to pixel electrode 140. A voltage difference between the driving voltage and the pixel voltage may be a direct current (DC) voltage. Alternatively, the voltage difference between the driving voltage and the pixel voltage may be an alternating current (AC) voltage.

The E-field reflecting layer 170 is disposed between pixel electrode 140 and the transparent electrode 160. The E-field reflecting layer 170 is correspondingly disposed to the light-transmitting hole 134. The E-field reflecting layer 170 reflects a portion of ambient light, when the electric field is generated between pixel electrode 140 and the transparent electrode 160. In other words, the electric field generated between pixel electrode 140 and the transparent electrode 160 changes a dielectric constant of the E-field reflecting layer 170 to enhance reflectivity.

E-field reflecting layer 170 includes an insulator material or a semiconductor material. The semiconductor material is preferable. Examples of the semiconductor material include silicon (Si), compound semiconductor, etc. Examples of the compound semiconductor include a compound of group III and group V such as gallium arsenide (GaAs), indium phosphorous (InP), gallium phosphorous (GaP), etc., a compound of group II and group VI such as cadmium sulfide (CdS), zinc telluride (ZnTe), etc., and a compound of group IV and group VI such as lead sulfide (PbS), etc. For example, the E-field reflecting layer 170 includes gallium arsenide (GaAs).

E-field reflecting layer 170 has a thickness of about 50 angstroms to about 500 angstroms, so that light generated by the backlight assembly may pass through the E-field reflecting layer 170. Preferably, E-field reflecting layer 170 has a thickness of about 100 angstroms to about 200 angstroms.

A first alignment layer is formed on pixel electrode 140 such that the first alignment layer covers light-reflecting layer 150. The first alignment layer includes a plurality of first alignment grooves (not shown) for aligning liquid crystal molecules along a specific direction.

Second substrate 200 is disposed facing first substrate 100. Second substrate 200 includes a second transparent substrate 210, a light blocking layer 220, a color filter 230, a common electrode 240 and a second alignment layer (not shown). Second transparent substrate 210 includes an optically transparent material such as glass or quartz, etc., the same material as that of the first transparent substrate 110. Second transparent substrate 210 has a smaller size than that of the first transparent substrate 110. Light blocking layer 220 is formed on second transparent substrate 210. Light blocking layer 220 is disposed over thin-film transistor TFT, data line DL and gate line GL, so that the light blocking layer covers the thin-film transistor TFT, the data line DL and gate line GL to prevent the thin-film transistor TFT, the data line DL and gate line GL from being shown.

Color filter 230 is formed on the second transparent substrate 210. The color filter 230 is disposed over pixel electrode 140. The color filter may cover edge portions of the light blocking layer 220. Color filter 230 includes a red color filter that selectively transmits red light, a green color filter that selectively transmits green light, and a blue color filter that selectively transmits blue light.

Common electrode 240 is formed on second transparent substrate 210 having light blocking layer 220 and color filter 230 formed thereon to cover light blocking layer 220 and color filter 230. Common electrode 240 receives a reference voltage. Common electrode 240 includes an optically transparent and electrically conductive material such as indium tin oxide (ITO), indium zinc oxide (IZO), amorphous indium tin oxide (a-ITO), etc.

Second alignment layer is formed on common electrode 240. The second alignment layer includes a plurality of second alignment grooves (not shown) for aligning liquid crystal molecules in a specific direction.

Liquid crystal layer 300 is disposed between the first substrate 100 and the second substrate 200. When the pixel voltage is applied to pixel electrode 140, and the reference voltage is applied to the common electrode 240, the arrangement of liquid crystal molecules of the liquid crystal layer 300 is altered to change optical transmissivity of ambient light or light generated by the backlight assembly. As a result, an image is displayed.

First and second polarizing plates 10 and 40 polarize light. For example, the first polarizing plate 10 has an optical axis that is substantially perpendicular to an optical axis of the second polarizing plate 40. First and second retardation films 20 and 30 alter the phase of light by an amount of a quarter wavelength. Alternatively, the first and second retardation films 20 and 30 alter the phase of light by an amount of a half wavelength. The first retardation film has a first retardation axis and the second retardation film has a second retardation axis that is substantially perpendicular to the first retardation axis.

The light refracting sheet 50 is disposed on the second polarizing plate 40. The light refracting sheet 50 refracts light that passes through the liquid crystal layer 300 to enhance front-view luminance. In FIGS. 1 and 3, the light refracting sheet 50 is disposed on the second polarizing plate 40. Alternatively, the light refracting sheet 50 may be disposed between the second polarizing plate 40 and the second retardation film 30.

The way reflectivity is enhanced by the electric field between pixel electrode 140 and the transparent electrode 160 will now be explained in detail. E-field reflecting layer 170 includes an insulator material or a semiconductor material. E-field reflecting layer 170 contains a plurality of electrons and a plurality of holes. The electrons and holes may be rearranged by an electric field. When an electric field is generated between pixel electrode 140 and the transparent electrode 160, the electric field alters an arrangement of electrons and holes to change a dielectric constant of the E-field reflecting layer 170. As a result, reflectivity of the E-field reflecting layer 170 is changed.

The reflectivity of the E-field reflecting layer 170 may be expressed as the following Expression 1.

$$R = Ro\{1 + C(F^{1/3}/\omega^2)\},$$

wherein 'R' represents a reflectivity of E-field reflecting layer 170 when an electric field is applied thereto, '$R_0$' represents the reflectivity of E-field reflecting layer 170 when no electric field is applied thereto, 'C' represents a constant relating to the material of E-field reflecting layer 170, 'F' is the strength of the electric field, '$\omega$' represents the angular frequency of the electric field.

As shown in Expression 1, the reflectivity 'R' of E-field reflecting layer 170 is proportional to $F^{1/3}$ and inversely proportional to $\omega^2$. In other words, when electric field 'F' increases, the reflectivity 'R' of the E-field reflecting layer 170 also increases. On the contrary, when the angular frequency '$\omega$' of the electric field increases, the reflectivity 'R' of E-field reflecting layer 170 decreases.

Figure 4:
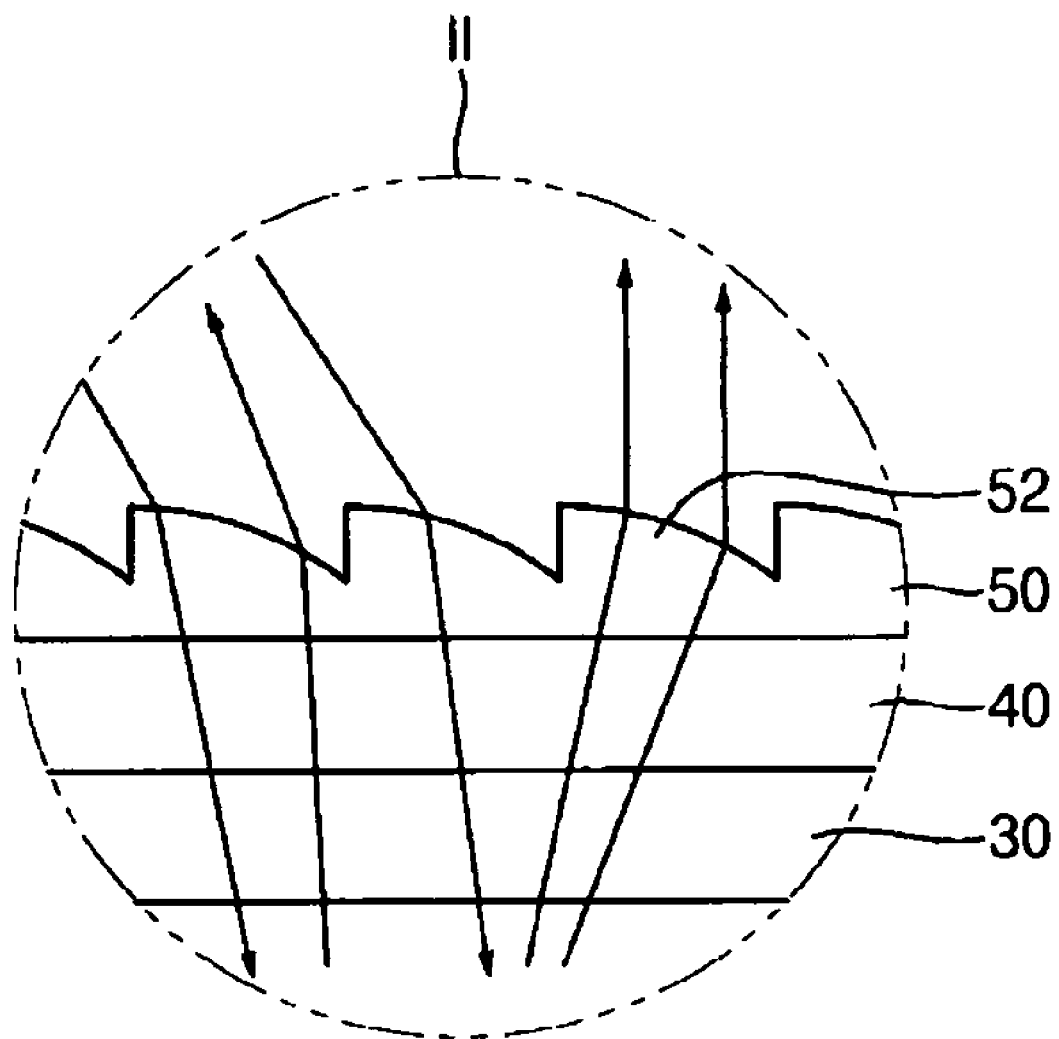
FIG. 4 is an enlarged view illustrating a portion 'II' in FIG. 3.

FIG. 4 is an enlarged view illustrating a portion 'II' in FIG. 3. Referring to FIG. 4, the light refracting sheet 50 includes a plurality of prisms 52 refracting light that originates from the display panel. The prisms have a saw tooth cross-sectional shape. For example, a cross-sectional shape of the prisms has a saw tooth shape with convex upper portions. Even though the prism having a saw tooth shape is disclosed in FIG. 4, the prism may have other shapes. For example, the prism may have triangular shape.

Figure 5:
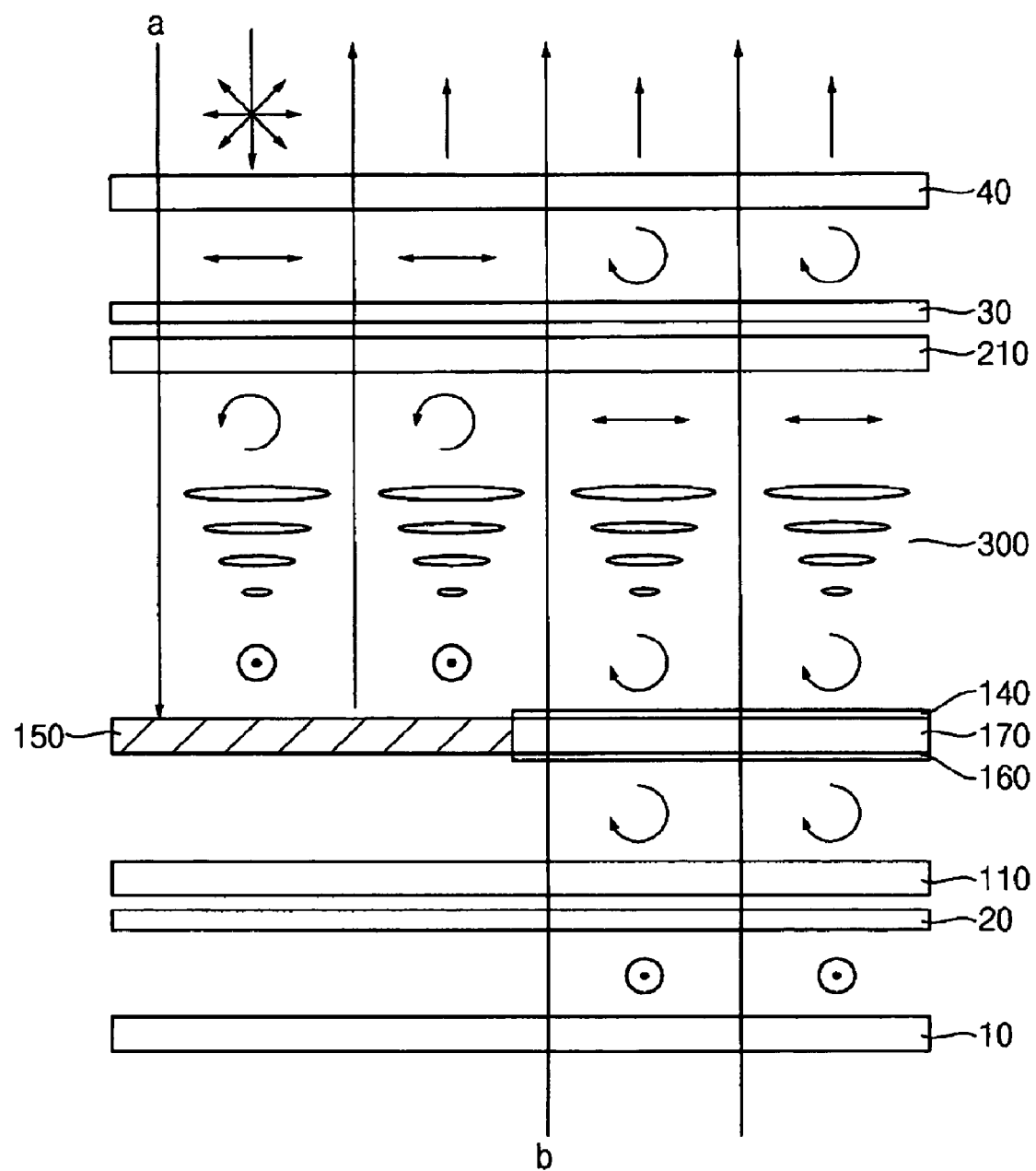
FIGS. 5 and 6 are conceptual views illustrating light paths when no electric field is applied to the liquid crystal layer of the display panel assembly in FIG. 1.
Figure 6:
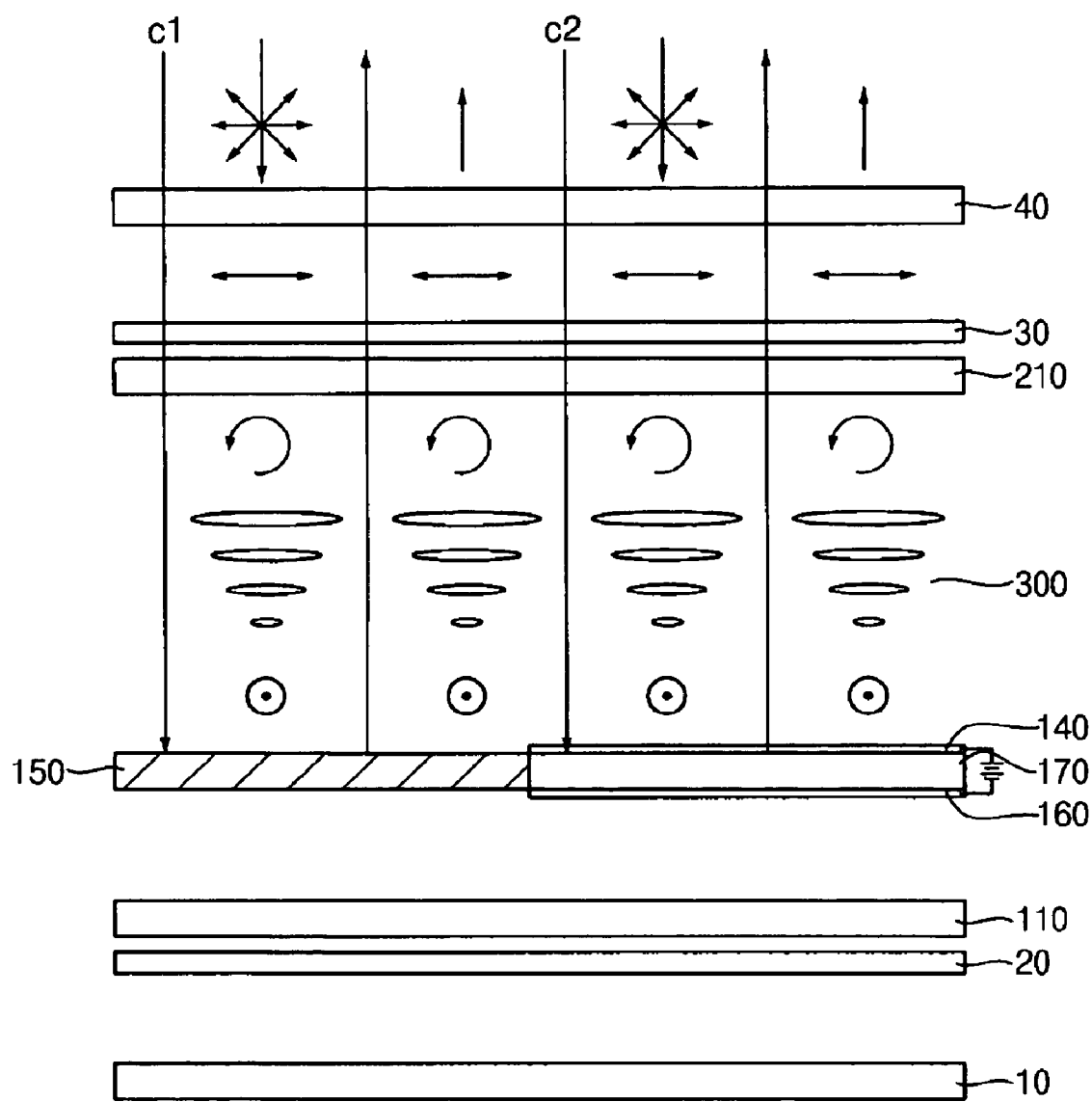

The path of light passing through the display panel assembly will now be explained. FIGS. 5 and 6 are conceptual views illustrating light paths when no electric field is applied to the liquid crystal layer of the display panel assembly in FIG. 1. In detail, FIG. 5 shows light paths when no electric field is applied to both of the liquid crystal layer and the E-field reflecting layer, and FIG. 6 shows light paths when no electric field is applied to the liquid crystal layer, but an electric field is applied to the E-field reflecting layer. Referring to FIG. 5, a portion of ambient light 'a' passes through the second polarizing plate 40 to be polarized along a third direction. The ambient light 'a' polarized along the third direction passes through the second retardation film 30 to have a phase change by a quarter wavelength. As a result, the ambient light 'a' is circularly polarized to rotate along a counterclockwise direction.

The ambient light 'a' that is circularly polarized to rotate along a counterclockwise direction passes through liquid crystal layer 300 to have a phase change by a quarter wavelength. As a result, the ambient light 'a' is linearly polarized to oscillate along a fourth direction that is substantially perpendicular to the third direction. The ambient light 'a' that is linearly polarized is reflected by light-reflecting layer 150.

The ambient light 'a' reflected by light-reflecting layer 150 passes through the liquid crystal layer 300 to have a phase change by a quarter wavelength. As a result, the ambient light 'a' is circularly polarized to rotate along a counterclockwise direction. The ambient light 'a' that is circularly polarized to rotate along a counterclockwise direction passes through the second retardation film 30 to have a phase change by a quarter wavelength to be linearly polarized to oscillate along the third direction. The ambient light 'a' that is linearly polarized to oscillate along the third direction passes through second polarizing plate 40 without any blocking.

On the other hand, a portion of light 'b' generated by the backlight assembly passes through the first polarizing plate 10 to be linearly polarized along the fourth direction. The light 'b' polarized along the fourth direction passes through the first retardation film 20 to have a phase change by a quarter wavelength. As a result, the light 'b' is circularly polarized to rotate along a clockwise direction. The light 'b' that is circularly polarized to rotate along a clockwise direction directly passes through the E-field reflecting layer 170 and enters the liquid crystal layer 300 having no electric field applied thereto. The light 'b' entering the liquid crystal layer 300 passes through the liquid crystal layer 300 to have a phase change by a quarter wavelength. As a result, the light 'b' is linearly polarized along the third direction.

The light 'b' that is linearly polarized along the third direction passes through the second retardation film 30 to be circularly polarized to rotate along a clockwise direction, and the light 'b' that is circularly polarized passes through the second polarizing plate 40 to be linearly polarized along the third direction. As a result, an image is displayed.

Figure 7:
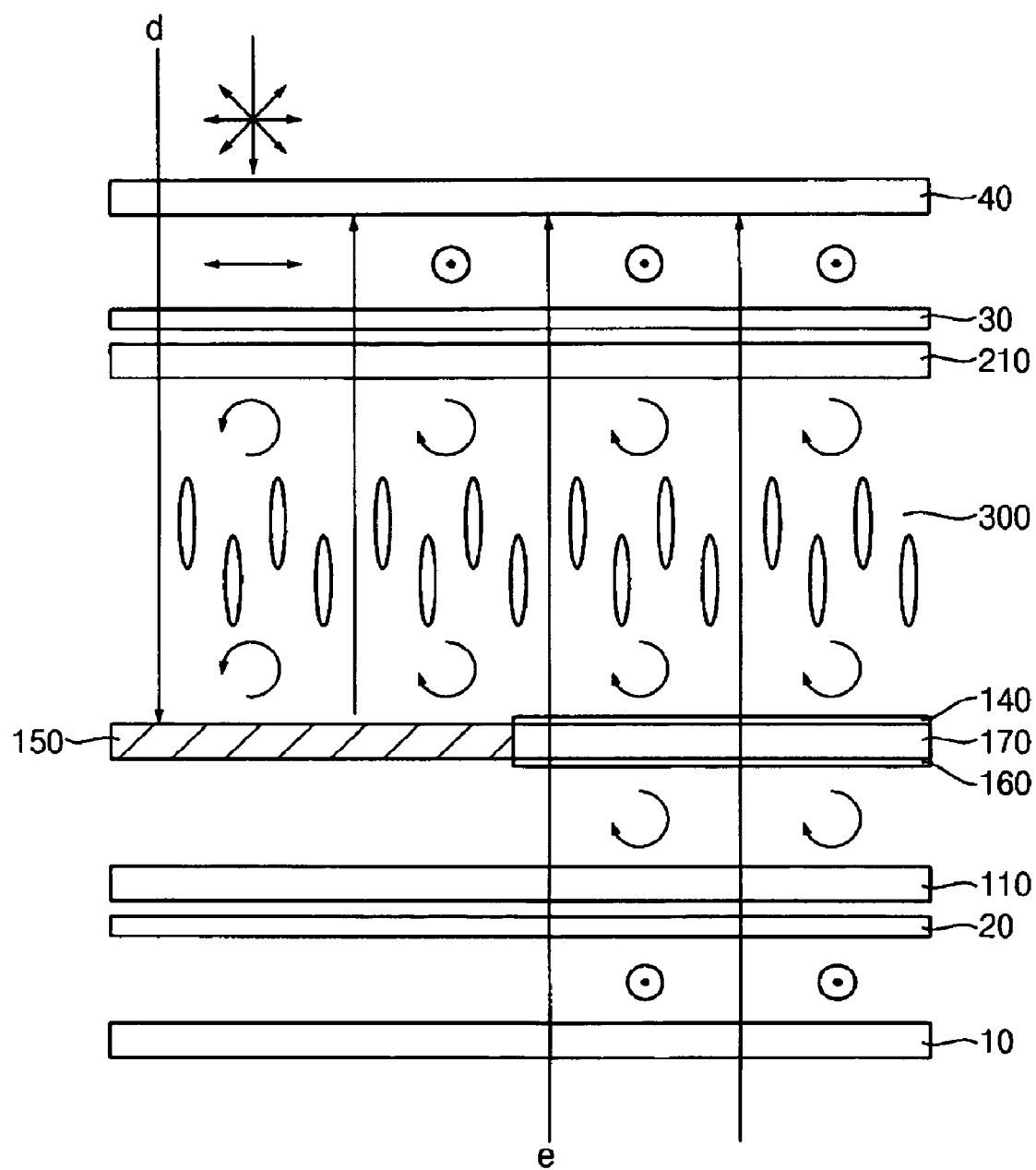
FIGS. 7 and 8 are conceptual views illustrating light paths when an electric field is applied to a liquid crystal layer of the display panel assembly in FIG. 1.
Figure 8:
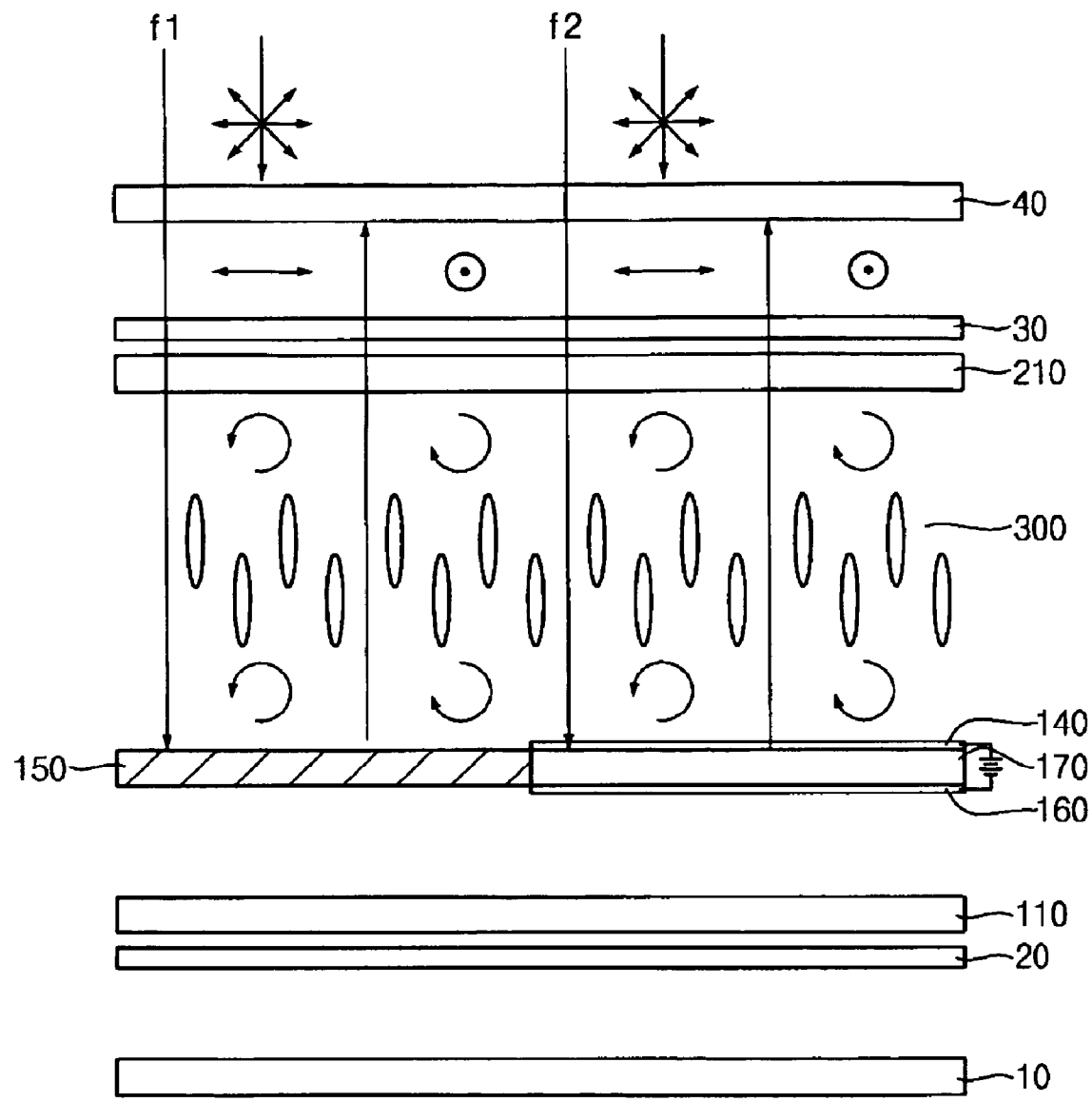

Referring to FIG. 6, a portion of ambient light 'c1', which advances toward the light-reflecting layer 150 undergoes substantially the same process to display an image as the ambient light 'a' in FIG. 5. Thus, any further explanation will be omitted. A portion of ambient light 'c2', which is incident toward the transmitting window 152, is reflected by the E-field reflecting layer 170 and the ambient light 'c2' undergoes substantially the same process as the light 'a' in FIG. 5 to display an image. As described above, when the ambient light, which is incident toward the transmitting window 152 to be leaked, is reflected by the E-field reflecting layer 170, a high luminance level may be obtained to display the image. FIGS. 7 and 8 are conceptual views illustrating light paths when an electric field is applied to a liquid crystal layer of the display panel assembly in FIG. 1. In detail, FIG. 7 corresponds to light paths when an electric field is not applied to the E-field reflecting layer and an electric field is applied to the liquid crystal layer, and FIG. 8 corresponds to a light path when an electric field is applied to both the E-field reflecting layer and the liquid crystal layer.

Referring to FIG. 7, when a portion of ambient light 'd' passes through the second polarizing plate 30, the portion of ambient light 'd' is polarized along a third direction. The portion of ambient light 'd' polarized along the third direction passes through the second retardation film 30 to have a phase change by a quarter wavelength. As a result, the portion of ambient light 'd' that passes through the second retardation film 30 is circularly polarized to rotate along a counterclockwise direction.

The portion of ambient light 'd' that is circularly polarized to rotate along a counterclockwise direction passes through the liquid crystal layer 300 without a phase change. The portion of ambient light 'd' that passes through liquid crystal layer 300 without a phase change is reflected by light-reflecting layer 150 to have a phase change by a half wavelength. As a result, the portion of ambient light 'd' that is reflected by light-reflecting layer 150 is circularly polarized to rotate along a clockwise direction. The portion of ambient light 'd' that is circularly polarized to rotate along a clockwise direction passes through liquid crystal layer 300 without a phase change. The portion of ambient light 'd' that passes through liquid crystal layer 300 without a phase change passes through second retardation film 30 to have a phase change by a quarter wavelength to be polarized along a fourth direction. The portion of ambient light 'd' that is polarized along a fourth direction is blocked by the second polarizing plate 40. As a result, no image is displayed through the portion of ambient light 'd'.

On the contrary, a portion of light 'e' generated from the backlight assembly passes through first polarizing plate 10 to be polarized along the fourth direction. The portion of light 'e' that is polarized along the fourth direction passes through the first retardation film 20 to have a phase change by a quarter wavelength. As a result, the portion of light 'e' that passes through first retardation film 20 is circularly polarized to rotate along a clockwise direction. The portion of light 'e' that is circularly polarized to rotate along a clockwise direction passes through E-field reflecting layer 170 and then passes through the liquid crystal layer 300 to which an electric field is applied without change.

The portion of light 'e' that passes through liquid crystal layer 300 passes through second retardation film 30. The portion of light 'e' that passes through second retardation film 30 is polarized to have a phase change by a quarter wavelength. As a result, the portion of light 'e' that passes through second retardation film 30 is linearly polarized along the fourth direction. The portion of light 'e' that is linearly polarized along the fourth direction is blocked by second polarizing plate 40. Therefore, no image is displayed by the portion of light 'e'.

Referring to FIG. 8, a portion of ambient light f1, which advances toward light-reflecting layer 150 has substantially the same light path as the portion of light 'd' in FIG. 7. Therefore, the portion of ambient light f1 does not display an image. The portion of ambient light f2, which advances toward the transmitting window 152, is reflected by E-field reflecting layer 170. Therefore, the portion of ambient light f2 has substantially the same path as the light 'd' in FIG. 7. As a result, the portion of ambient light f2 does not display an image.

According to the present embodiment, when pixel electrode 140 and transparent electrode 160 apply an electric field to the E-field reflecting layer 170 disposed between pixel electrode 140 and transparent electrode 160, pixel electrode 140 reflects ambient light to enhance luminance.

Example Embodiment 2 of a Display Panel Assembly

Figure 9:
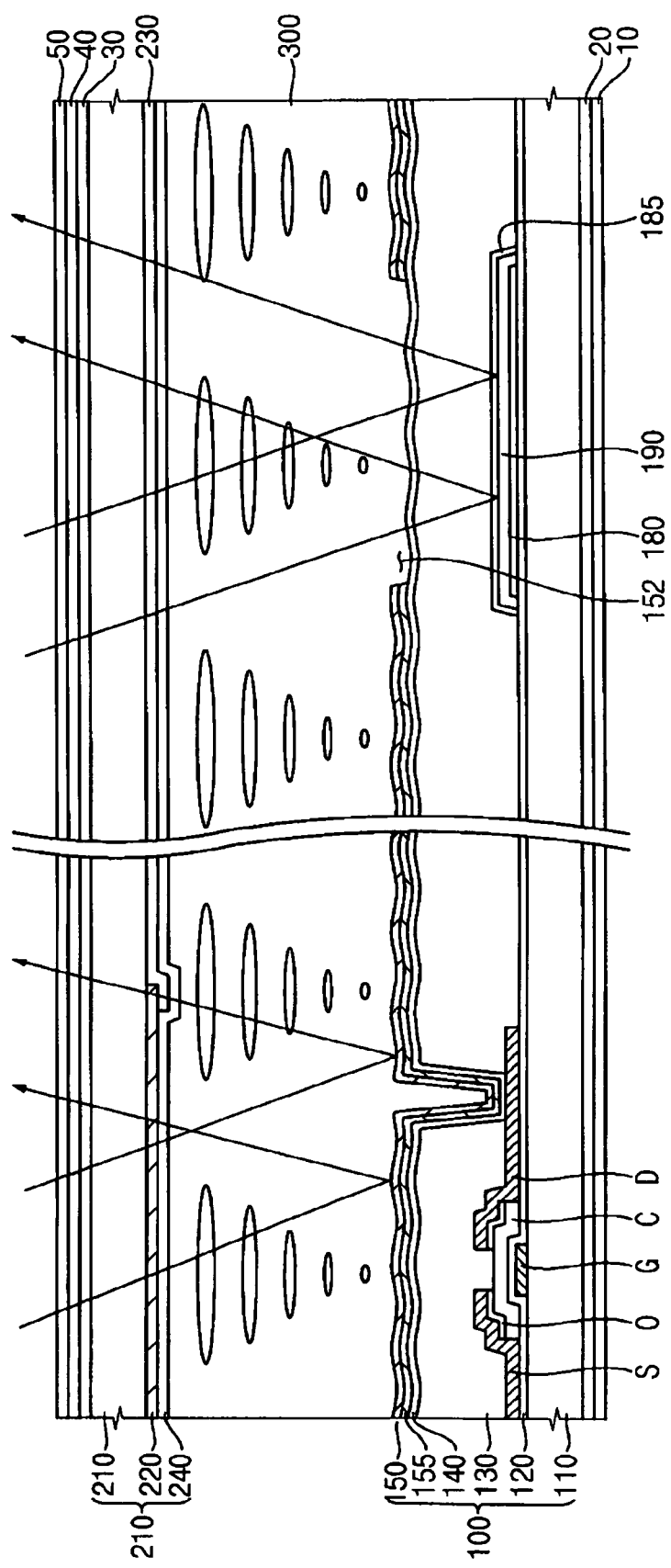
FIG. 9 is a cross-sectional view illustrating a portion of a display panel assembly according to another example embodiment of the present invention.

FIG. 9 is a cross-sectional view illustrating a portion of a display panel assembly according to another example embodiment of the present invention. The display panel assembly of the present embodiment is the same as in the previous example embodiment except for a protecting layer, a pixel electrode, a first transparent electrode, a second transparent electrode and an E-field reflecting layer. Thus, the same reference numerals will be used to refer to the same or like parts as those described in previous example embodiment and any further explanation will be omitted.

Referring to FIG. 9, a display panel assembly includes a first substrate 100, a second substrate 200, a liquid crystal layer 300, a first polarizing plate 10, a first retardation film 20, a second retardation film 30, a second polarizing plate 40 and a light refracting sheet 50. The display panel assembly displays an image by using ambient light and light generated by a backlight assembly.

First substrate 100 includes a first transparent substrate 110, a data line DL, a gate line GL, a storage electrode, a gate insulation layer 120, a thin-film transistor TFT, a protecting layer 130, a pixel electrode 140, a reflecting layer 150, a connecting layer 155, a first transparent electrode 180, a second transparent electrode 185, an E-field reflecting layer 190 and a first alignment layer.

Protecting layer 130 is formed on gate insulation layer 120 such that the protecting layer 130 covers the thin-film transistor TFT and the data line DL. For example, an organic layer may be employed as the protecting layer 130, and the protecting layer 130 is thicker than gate insulation layer 120. Protecting layer 130 has an embossed pattern formed on its surface. Protecting layer 130 includes a contact hole 132. Drain electrode D of thin-film transistor TFT is electrically connected to pixel electrode 140 through the contact hole 132. Pixel electrode 140 is formed on the protecting layer 130. Pixel electrode 140 is disposed in a pixel region defined by each of gate lines GL and each of the data lines DL. Pixel electrode 140 is electrically connected to the drain electrode D to receive a pixel voltage from the drain electrode D.

Pixel electrode 140 includes an optically transparent and electrically conductive material such as indium tin oxide (ITO), indium zinc oxide (IZO), amorphous indium tin oxide (a-ITO), etc. An optically transparent and electrically conductive layer may be patterned through a photolithography process to form pixel electrode 140.

Light-reflecting layer 150 is formed on pixel electrode 140. Light-reflecting layer 150 includes an opening corresponding to the transmitting window 152. The light-reflecting layer 150 includes, for example, metal for reflecting light. The light-reflecting layer 150 includes, for example, aluminum (Al), aluminum neodymium (AlNd), etc. Light-reflecting layer 150 includes a reflecting portion that reflects a portion of ambient light, and the transmitting window 152 that transmits a portion of light generated by the backlight assembly. The reflecting portion corresponds to a region where the light-reflecting layer 150 is formed, and the transmitting window 152 corresponds to a region where the light-reflecting layer 150 is not formed. Preferably, an area of the transmitting window 152 is about 60% to about 70% of a unit pixel area.

First transparent electrode 180 is formed on gate insulation layer 120 so as to correspond to light-transmitting hole 152. First transparent electrode 180 has a larger size than the light-transmitting hole 152. First transparent electrode 180 includes an optically transparent and electrically conductive material such as indium tin oxide (ITO), indium zinc oxide (IZO), amorphous indium tin oxide (a-ITO), etc., the same material as that of pixel electrode 140. The first transparent electrode 180 receives a first driving voltage from an external voltage generating device (not shown).

E-field reflecting layer 190 is correspondingly disposed to the light-transmitting window 152. The E-field reflecting layer 190 is formed on gate insulation layer 120 such that the E-field reflecting layer 190 covers the first transparent electrode 180.

Second transparent electrode 185 is covered by the protecting layer 140. The second transparent electrode 185 includes an optically transparent and electrically conductive material such as indium tin oxide (ITO), indium zinc oxide (IZO), amorphous indium tin oxide (a-ITO), etc., the same material as that of pixel electrode 140. Second transparent electrode 185 receives a second driving voltage that is different from the first driving voltage from an external voltage from an external voltage generating device (not shown). The first and second driving voltages applied to the transparent electrodes 180 and 185, respectively apply an electric field to E-field reflecting layer 190. For example, the electric field applied to E-field reflecting layer 190 is in the range of about 10 kV/cm to about 100 kV/cm, and a frequency of the electric field is in the range of about 0.1 kHz to about 10 kHz.

When an electric field is generated between the first and second transparent electrodes 180 and 185 or applied to the E-field reflecting layer 190, the E-field reflecting layer 190 reflects a portion of ambient light. E-field reflecting layer 190 includes an insulator material or a semiconductor material, but semiconductor material is preferable. Examples of the semiconductor material include silicon (Si), compound semiconductor, etc. The E-field reflecting layer 190 has a thickness of about 50 angstroms to about 500 angstroms. Preferably, the E-field reflecting layer 190 has a thickness of about 100 angstroms to about 200 angstroms.

According to the present embodiment, E-field reflecting layer 190 is disposed between first and second transparent electrodes 180 and 185, and first and second transparent electrodes 180 and 185 apply an electric field to E-field reflecting layer 190 for reflecting ambient light. As a result, luminance of the display panel assembly is enhanced.

Example Embodiment of a Display Apparatus

Figure 10:
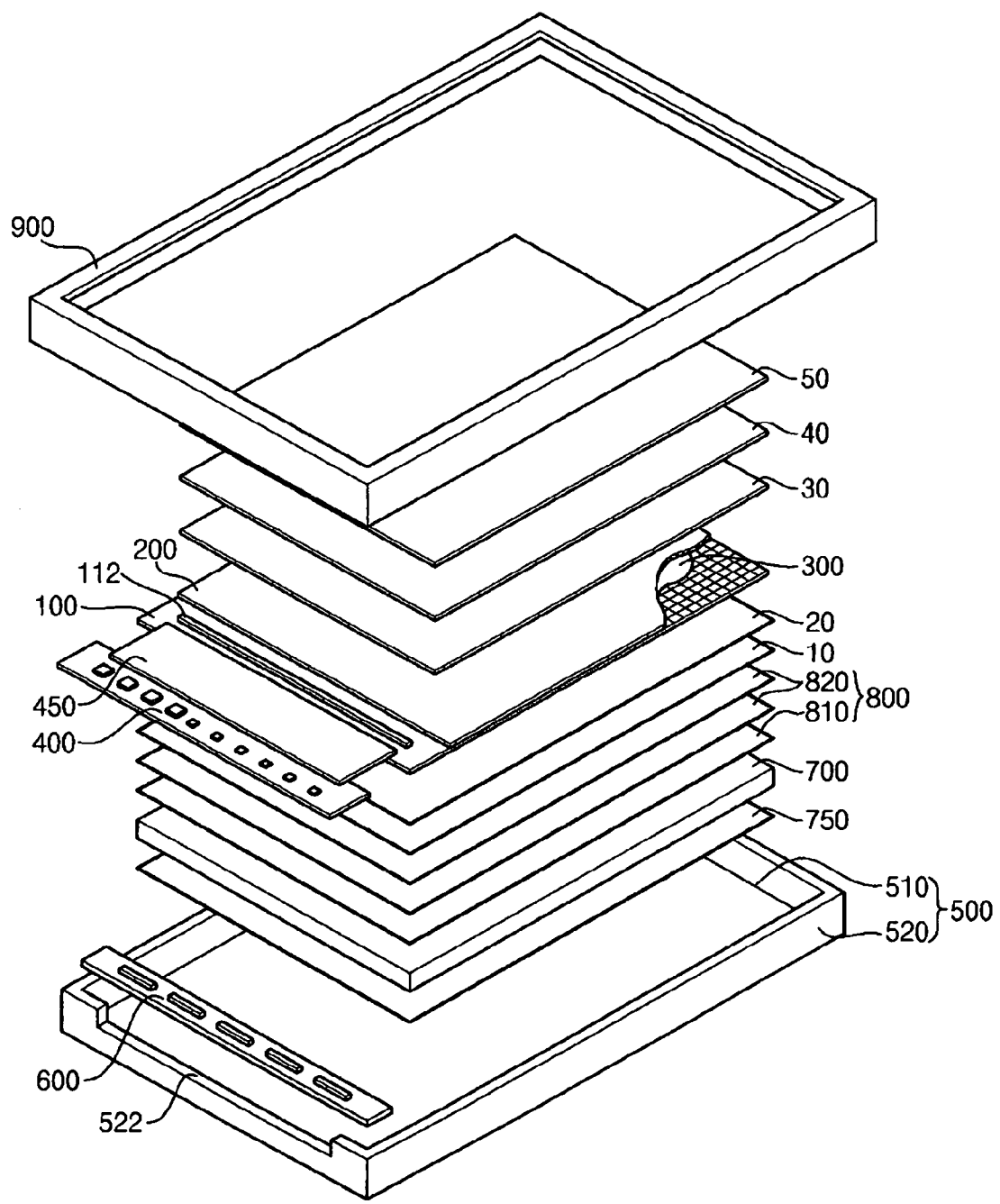
FIG. 10 is an exploded perspective view illustrating a display apparatus according to an example embodiment of the present invention.

FIG. 10 is an exploded perspective view illustrating a display apparatus according to an example embodiment of the present invention. A display panel assembly of a display apparatus according to the present example embodiment is substantially the same as the example embodiment in FIGS. 1 to 8. Therefore, further explanation will be omitted. Referring to FIG. 10, a display apparatus according to the present example embodiment includes a display panel assembly, a printed circuit board 400, a flexible printed circuit 450, a backlight assembly and a top chassis 900. The display panel assembly displays an image by using ambient light and light generated by the backlight assembly. The display panel assembly includes a first substrate 100 having a thin-film transistor TFT, a second substrate 200 having a color filter, and liquid crystal layer 300 disposed between the first and second substrates 100 and 200. For example, a driving circuit is formed on side portions of the first substrate 100.

Additionally, the display panel assembly further includes a first polarizing plate 10, a second polarizing plate 40, a first retardation film 20, a second retardation film 30 and a light refracting sheet 50. The first polarizing plate 10 is disposed under the first substrate 100. First retardation film 20 is disposed between the first polarizing plate 10 and the first substrate 100. Second retardation film 30, second polarizing plate 40 and light refracting sheet 50 are disposed over the second substrate in sequence. Printed circuit board 400 includes a driving circuit unit processing an image signal. The driving circuit unit converts an external image signal into a first driving signal controlling a driving chip 112. Flexible printed circuit 450 electrically connects printed circuit board 400 to first substrate 100 to transfer the first driving circuit generated by printed circuit board 400 to driving chip 112 of first substrate 100. Driving chip 112 generates a second driving signal controlling the thin-film transistor TFT by using the first driving signal. Flexible printed circuit 450 may be bent so that the printed circuit board 400 may be disposed under the display panel assembly.

The backlight assembly includes a receiving container 500, a light-generating unit 600, a light-guide plate 700, a light-reflecting plate 750 and optical sheets 800. The receiving container 500 includes a bottom plate 510 and sidewalls 520 protruded from edge portions of the bottom plate 510. The bottom plate 510 and the sidewalls 520 define a receiving space to receive the light-generating unit 600, the light-guide plate 700, the light-reflecting plate 750, the optical sheets 800 and the display panel assembly. One of the sidewalls 520, which faces the flexible printed circuit 600, includes a recessed portion 522. The flexible printed circuit 600 may be bent through the recessed portion 522.

Light-generating unit 600 is disposed such that the light-generating unit 600 is disposed near one of the sidewalls 520. The light-generating unit 600 receives electric power from an external power supply to generate light. Light-generating unit 600 includes, for example, light-emitting diodes. The light-emitting diodes are disposed on a driving substrate. The light-emitting diodes receive electric power from the driving substrate to provide the light-guide plate 700 with light. Alternatively, the light-generating unit 600 may include a cold cathode fluorescent lamp (CCFL) having a rod-shape. Light-guide plate 700 is disposed in the receiving container 500 such that the light-generating unit 600 faces a side face of the light-guide plate 700. Light generated by the light-generating unit 600 enters the light-guide plate 700 through a the side face of light-guide plate 700 and exits from light-guide plate 700 through the upper face of the light-guide plate 700 to enter the display panel assembly. Light-reflecting plate 750 is disposed in the receiving container 500. Light-reflecting plate 750 is disposed under light-guide plate 700 and reflects light that exits light-guide plate 700 through its lower face toward light-guide plate 700.

Optical sheets 800 are disposed over the backlight assembly to enhance optical characteristics of light generated by the backlight assembly. The optical sheets 800 include a diffusion sheet 810 for diffusing light in order to enhance luminance uniformity, and a prism sheet 820 for enhancing a front-view luminance. The top chassis 900 surrounds edge portions of the display panel assembly, and is combined with the sidewalls of the receiving container 500 to fasten the display panel assembly to the receiving container 500. The top chassis 900 protects the display panel assembly, which is brittle, from external impacts and prevents the display panel assembly from being separated from the receiving container 500.

Example Embodiment of Method of Manufacturing an Array Substrate

Figure 11A:
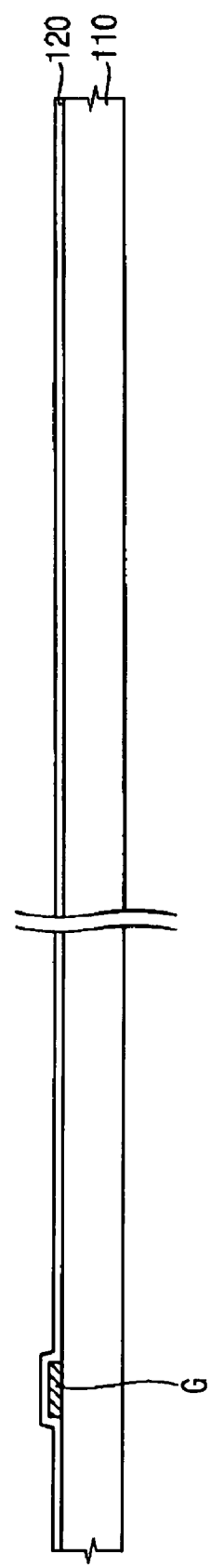
Figure 11B:
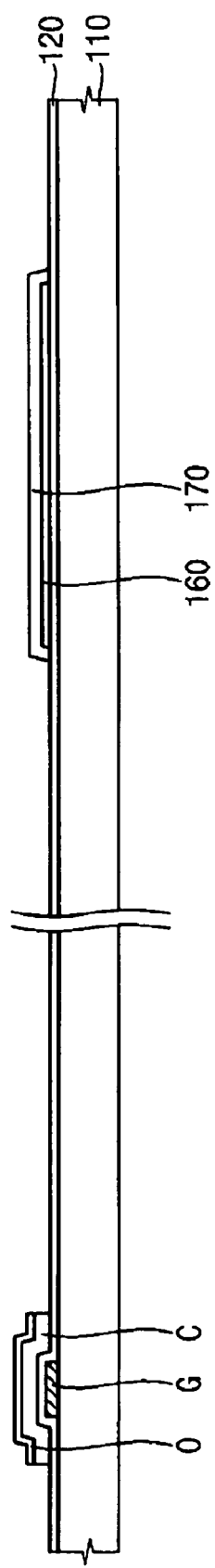
Figure 11C:
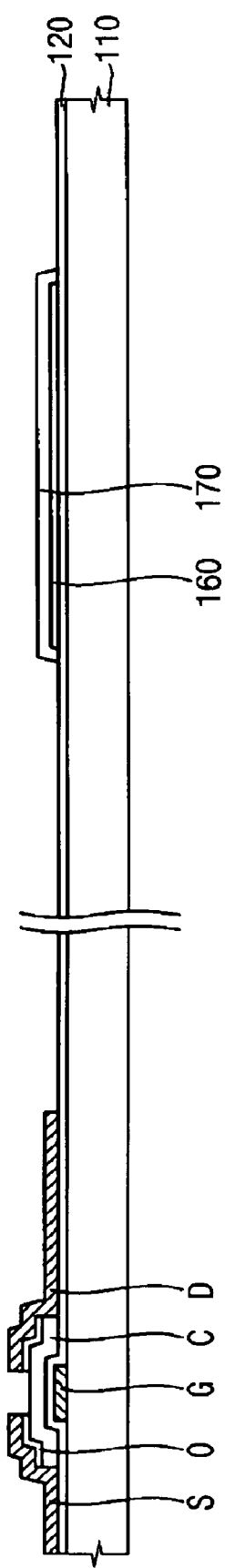
Figure 11E:
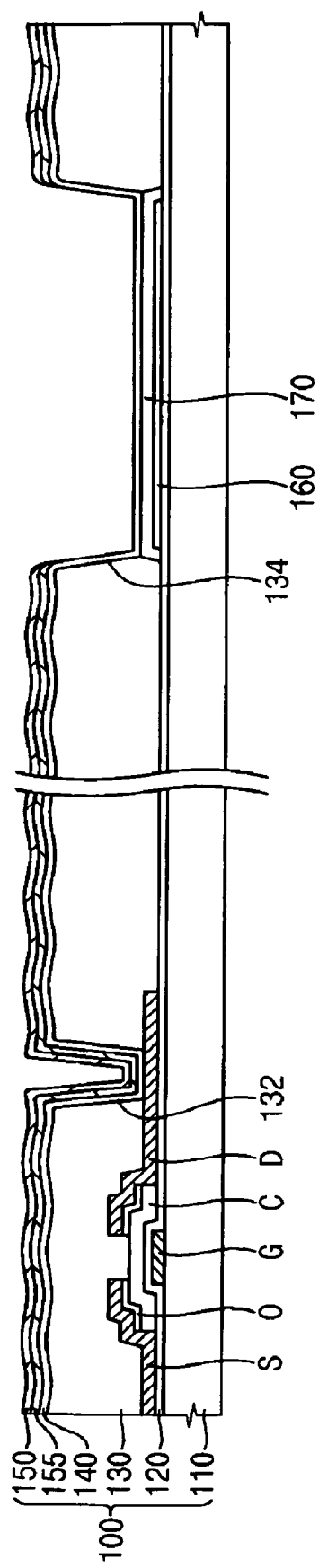

FIGS. 11A to 11E are cross-sectional views illustrating a method of manufacturing an array substrate according to an example embodiment of the present invention. In detail, FIG. 11A shows a process of forming the gate insulation layer to cover the gate line and gate electrode. FIG. 11B shows a process of forming the channel layer, the transparent electrode and the E-field reflecting layer. FIG. 11C shows a process of forming data line, the source electrode and the drain electrode. FIG. 11D shows a process of forming a protecting layer and removing a portion of the protecting layer. FIG. 11E shows a process of forming the pixel electrode and the light-reflecting layer 150.

Referring to FIG. 11A, the gate electrode G is formed on the transparent substrate 110. Gate electrode G is simultaneously formed with the gate line (not shown). Gate electrode G protrudes from the gate line. Then, gate insulation layer 120 is formed to cover gate electrode G and the gate line. Referring to FIG. 11B, transparent electrode 160 is formed on gate insulation layer 120. Transparent electrode 160 includes an optically transparent and electrically conductive material such as indium tin oxide (ITO), indium zinc oxide (IZO), amorphous indium tin oxide (a-ITO), etc. For example, the transparent electrode 160 is patterned through a photolithography process.

Then, E-field reflecting layer 170 is formed on the transparent electrode 160. For example, E-field reflecting layer 170 is formed such that it covers transparent electrode 160 and has a thickness of no more than about 500 angstroms. E-field reflecting layer 170 includes, for example an insulator material or a semiconductor material such as silicon (Si), compound semiconductor, etc. When E-field reflecting layer 170 includes a semiconductor material, it may be formed simultaneously with channel layer C. Channel layer C is formed on gate insulation layer 120 such that it crosses gate electrode G. An ohmic contact layer O including a highly concentrated dopant is formed on the channel layer C.

Referring to FIG. 1C, the source electrode S and the drain electrode D are formed such that the source electrode S and the drain electrode D cover portions of the ohmic contact layer O. The source electrode S and the drain electrode D are simultaneously formed with the data line (not shown) formed on gate insulation layer 120. Source electrode S and drain electrode D are formed such that the source electrode S and the drain electrode D are spaced apart from each other. Then, ohmic contact layer O exposed between the source electrode S and the drain electrode D is etched, for example by plasma. As a result, the ohmic contact layer O is separated into two pieces. Then, the thin-film transistor TFT including gate electrode G, the source electrode S, the drain electrode D, the channel layer C and the ohmic contact layer O is completed.

Referring to FIG. 1D, protecting layer 130 is formed on gate insulation layer 120 such that protecting layer 130 covers the thin-film transistor TFT and E-field reflecting layer 170. Protecting layer 130 is formed such that a thickness of the protecting layer 130 is thicker than that of gate insulation layer 120. Then, portions of the protecting layer 130 are removed, for example by plasma to form the contact hole 132 and the light-transmitting hole 134. The contact hole 132 is disposed over the drain electrode D, and the light-transmitting hole 134 is disposed over the E-field reflecting layer 170.

Referring to FIG. 11E, pixel electrode 140 is formed on the protecting layer 130. Pixel electrode 140 includes an optically transparent and electrically conductive material such as indium tin oxide (ITO), indium zinc oxide (IZO), amorphous indium tin oxide (a-ITO), etc., the same material as that of the transparent electrode 160. Pixel electrode 140 is electrically connected to the drain electrode D through the contact hole 132. Pixel electrode 140 is also formed on the E-field reflecting layer 170 exposed through the light-transmitting hole 134. Then, connecting layer 155 is formed on pixel electrode 140 except for a region corresponding to the light-transmitting hole 134. The connecting layer 155 includes, for example, molybdenum tungsten alloy (MoW). Then, reflecting layer 150 is formed on connecting layer 155. Reflecting layer 150 includes metal in order to reflect ambient light.

Reflecting layer 150 includes, for example, aluminum (Al) or aluminum neodymium (AlNd).

Having described of the present invention and its advantages, it is noted that various changes, substitutions and alterations can be made by those skilled in the art without however departing from the spirit and scope of the invention.

What is claimed is:

1. An array substrate comprising:
    a substrate;
    a switching element formed in a pixel region of the substrate;
    a pixel electrode electrically connected to the switching element;
    a light-reflecting layer contacting the pixel electrode, the light-reflecting layer including an opening corresponding to a transmitting window; and
    an electric field (E-field) reflecting section having an E-field reflecting layer formed on the substrate under the transmitting window, the E-field reflecting section reflecting light when an electric field is applied to the E-field reflecting layer.

2. The array substrate of claim 1, wherein the E-field reflecting section comprises:
    a transparent electrode formed under the pixel electrode to correspond to the transmitting window;
    wherein the E-field reflecting layer disposed between the pixel electrode and the transparent electrode, the E-field reflecting layer reflecting the light when the electric field is generated by the pixel electrode and the transparent electrode.

3. The array substrate of claim 2, wherein the E-field reflecting layer comprises a semiconductor material.

4. The array substrate of claim 3, wherein the semiconductor material corresponds to silicon (Si).

5. The array substrate of claim 3, wherein the semiconductor material corresponds to compound semiconductor.

6. The array substrate of claim 2, wherein the E-field reflecting layer comprises an insulator material.

7. The array substrate of claim 2, wherein the E-field reflecting layer has a thickness in a range of about 50 angstroms to about 500 angstroms.

8. The array substrate of claim 2, further comprising a protecting layer disposed between the pixel electrode and the switching element to protect the switching element.

9. The array substrate of claim 8, wherein the protecting layer comprises a light-transmitting hole, so that the pixel electrode makes contact with the E-field reflecting layer in the light-transmitting hole.

10. The array substrate of claim 1, wherein the E-field reflecting section comprises:
    a first transparent electrode disposed under the transmitting window;
    a second transparent electrode disposed under the first transparent electrode such that the second transparent electrode faces the first transparent electrode; and
    an E-field reflecting layer disposed between the first and second transparent electrodes, the E-field reflecting layer reflecting the light when the electric field is generated by the first and second transparent electrodes.

11. The array substrate of claim 10, wherein the E-field reflecting layer comprises a semiconductor material.

12. The array substrate of claim 10, wherein the E-field reflecting layer has a larger area than that of the transmitting window.

13. The array substrate of claim 10, wherein the E-field reflecting layer has a thickness in a range of about 50 angstroms to about 500 angstroms.

14. The array substrate of claim 1, wherein the electric field is in a range of about 10 kV/cm to about 100 kV/cm.

15. The array substrate of claim 1, wherein the electric field has a frequency in a range of about 0.1 kHz to about 10 kHz.

16. A display apparatus comprising:
    a backlight assembly generating light; and
    a display panel displaying an image by using the light generated by the backlight assembly and ambient light, the display panel comprising:
        a first substrate having a reflecting portion reflecting the ambient light, and a transmitting portion transmitting the light generated by the backlight assembly; wherein the transmitting portion includes an electric field (E-field) section having an E-field reflecting layer formed on the first substrate, the E-field reflecting layer reflecting the ambient light in response to an electric field applied to the E-filed reflecting layer;
        a second substrate facing the first substrate; and
        a liquid crystal layer disposed between the first and second substrates.

17. The display apparatus of claim 16, further comprising:
    a first polarizing plate disposed under the first substrate; and
    a second polarizing plate disposed over the second substrate.

18. The display apparatus of claim 16, further comprising:
    a first retardation film disposed under the first substrate to change the phase of light; and
    a second retardation film disposed over the second substrate to change the phase of light.

19. The display apparatus of claim 16, further comprising a light refracting sheet disposed over the second substrate to enhance a front-view luminance.

20. The display apparatus of claim 19, wherein the light refracting sheet comprises a plurality of prisms for refracting light.

21. The display apparatus of claim 20, wherein the prisms have a cross-sectional shape corresponding to a sawtooth shape.

22. A method of manufacturing an array substrate comprising:
    forming a gate line and a gate electrode on a substrate;
    forming a transparent electrode on the substrate;
    forming a channel layer on the gate electrode, and an E-field reflecting layer on the transparent electrode;
    forming a data line, and source and drain electrodes on the channel layer;
    forming a protecting layer on the substrate to cover the data line, the source electrode and the drain electrode;
    removing portions of the protecting layer to form a contact hole disposed over the drain electrode, and a light-transmitting hole over the E-field reflecting layer;
    forming a pixel electrode that is electrically connected to the drain electrode through the contact hole, and makes contact with the E-field reflecting layer through the light-transmitting hole; and
    forming a light-reflecting layer having an opening corresponding to a transmitting window over the E-field reflecting layer.

23. The method of claim 22, wherein the E-field reflecting layer is formed by a semiconductor material.

24. The method of claim 22, further comprising:
    forming a gate insulation layer on the substrate to cover the gate line and the gate electrode prior to forming the transparent electrode.

* * * * *